United States Patent
Nasrallah

(10) Patent No.: US 8,744,913 B2
(45) Date of Patent: Jun. 3, 2014

(54) SYSTEM AND METHOD FOR PLACING ORDERS

(75) Inventor: Ghassan Victor Nasrallah, Troy, MI (US)

(73) Assignee: GVN Group Corp., Pontiac, MI (US)

(*) Notice: Subject to any disclaimer, the term of this patent is extended or adjusted under 35 U.S.C. 154(b) by 837 days.

(21) Appl. No.: 12/552,327

(22) Filed: Sep. 2, 2009

(65) Prior Publication Data

US 2011/0054955 A1    Mar. 3, 2011

(51) Int. Cl.
*G06Q 30/00* (2012.01)
*G06Q 50/00* (2012.01)
*G06Q 10/00* (2012.01)

(52) U.S. Cl.
USPC ............................ 705/15; 705/1.1; 705/5

(58) Field of Classification Search
USPC .................................. 705/1.1, 5, 15–18
See application file for complete search history.

(56) References Cited

U.S. PATENT DOCUMENTS

| | | | |
|---|---|---|---|
| 4,415,065 A | 11/1983 | Sandstedt | |
| 4,777,488 A | 10/1988 | Carlman et al. | |
| 5,504,589 A | 4/1996 | Montague et al. | |
| 5,838,798 A | 11/1998 | Stevens, III | |
| 6,473,739 B1 | 10/2002 | Showghi et al. | |
| 7,174,308 B2 | 2/2007 | Bergman et al. | |
| 2002/0095342 A1* | 7/2002 | Feldman et al. | 705/15 |
| 2002/0143655 A1 | 10/2002 | Elston et al. | |
| 2004/0054592 A1* | 3/2004 | Hernblad | 705/15 |
| 2007/0088624 A1* | 4/2007 | Vaughn et al. | 705/26 |
| 2007/0106568 A1 | 5/2007 | Asher et al. | |
| 2008/0147514 A1* | 6/2008 | Shuster et al. | 705/26 |

* cited by examiner

*Primary Examiner* — George Chen
(74) *Attorney, Agent, or Firm* — Frederick W. Mau, II

(57) ABSTRACT

A system and method for placing orders at restaurants utilizing a customer's personal communication device. The system and method provide for efficient ordering and subsequent payment by the customer. The system and method allows customers to register upon entering a restaurant thus allowing the customers to subsequently place one or more orders for food and drinks via a cellular phone, laptop, or other personal communications device.

14 Claims, 2 Drawing Sheets

SYSTEM AND METHOD FOR PLACING ORDERS

FIELD OF THE INVENTION

The present invention generally relates to a system for placing orders from customers. More particularly, the present invention relates to a system for placing orders from customers at restaurants utilizing a personal communication device.

BACKGROUND

Many people visit restaurants due to convenience, entertainment, and the ability to enjoy food and drinks not easily prepared at home. To provide for an enjoyable dining experience, one of the most important tasks for restaurants is the ability to timely take and fill customer orders. Restaurant customers can quickly become dissatisfied with the service of the restaurant when waiting too long for a waiter or waitress to attend to the customer to take an order for food or drinks. Similarly, customers may also become dissatisfied when waiting too long for food or drinks to arrive after placing an order. Many times the delays can be attributed to the restaurant being too busy, understaffed, misplaced order tickets, and oversight of the wait staff attending to the customers.

To alleviate some of the aforementioned problems, systems and methods have been created to aid in receiving and filling orders from restaurant customers. Such systems may include the use of ordering terminals that are available within the restaurant or placed at tables within the restaurant for use by customers to place food and drink orders. Customers may use the terminals to directly place orders without the need for a waiter or waitress to take the order from the customer. Upon placing the order, the list of items in the order is communicated to the restaurant staff and prepared for the customer. Examples of such systems are described in U.S. Pat. Nos. 5,912,743; 5,235,509; and 4,777,488. While such systems have benefits, the cost and size of such systems may not be appropriate in certain instances. For example, ordering terminals at each table may not be convenient for smaller restaurants and diners where space is a premium.

Other ordering systems have been created which utilize a customer's personal communication device, such as a cellular phone with text messaging or internet capability, to place an order. In these type systems, a customer may send an order via text messaging or emailing feature on their cellular phone. Examples of such systems are described in U.S. Pat. Nos. 7,174,308 and 6,473,739. While such systems provide for efficient ordering, such systems typically require payment information to be entered with orders as the customers are not registered in the system. The payment information may include credit card information or information regarding the customer's seating location when paying with cash. Other ordering systems utilizing customer's communication devices require pre-registration with the vendor to allow the placing of orders. The pre-registration procedures, whether via website or other means may be a time consuming endeavor thus deterring use for restaurants rarely visited by the customer, especially where a customer needs to register for multiple restaurants. As such, there is a need in the art for improved systems and methods of placing orders at restaurants with personal communication devices which allow for simplified customer registration.

SUMMARY OF THE INVENTION

Disclosed herein, is a restaurant order processing system comprising a customer registration terminal and an order receiving terminal. The customer registration terminal receives customer registration information from a customer upon entering the restaurant thus registering the customer as a customer of the restaurant and allowing the customer to submit orders via a personal communication device. The customer registration terminal may comprise a touch screen for providing customer registration information. The touch screen may allow customers to select a desired seat based on availability within the restaurant. The customer registration terminal may comprise a credit card reader for receiving credit card information from said customer. The order receiving terminal receives orders placed by registered customers via a personal communication device, the order receiving terminal having a display for communicating received orders to the restaurant staff.

The restaurant order processing system may further comprise a central computer system in communication with the customer registration terminal and the order receiving terminal. The central computer system receives the customer registration information from the customer registration terminal and order information from the restaurant customer sent via a personal communication device. The central computer system also communicates the order information to the order receiving terminal at the restaurant. The central computer system may be located at a location off site from the restaurant. Alternatively, the customer registration terminal and the order receiving terminal may be in direct communication, whereby customer registration information is communicated to the order receiving terminal upon customer registration thereby allowing the customer to place an order directly to the order receiving terminal via a personal communication device. The order receiving terminal may utilize a telephone number or email address for receiving the order information from the customer. The order receiving terminal may comprise communication hardware for communicating with the customer via the customer's personal communication device. The communication hardware may be selected from one or more of the group consisting of a keyboard, visual display with touch screen, and a computer with speech recognition capability.

Also disclosed herein is a method for placing an order in a restaurant comprising receiving registration information via a customer registration terminal from a customer upon the customer entering the restaurant thereby allowing the customer to place an order via the customer's personal communication device; providing a phone number for placing an order via text message or an email address to the customer; receiving an order for one or more items from the customer via a personal communication device; and displaying the order on a order receiving terminal for processing by the restaurant staff. The registration information includes one or more selected from the group consisting of the customer's cellular phone number, the customer's email address, payment information, customer's name, customer's physical address, and desired seat location. The order information from the customer may be received by a central computer system in communication with the customer registration terminal and the order receiving terminal. The central computer system may receive the customer registration information from the customer registration terminal and order information from the customer's personal communication device and communicate the order information to the order receiving terminal at the restaurant. The central computer system is located at a location off site from said restaurant.

Alternatively, the customer registration terminal and the order receiving terminal may be in direct communication, whereby customer registration information is communicated to the order receiving terminal upon customer registration thereby allowing the customer to place an order directly to the order receiving terminal via a personal communication device. The order receiving terminal may utilize a telephone number or email address for receiving the order information from the customer.

DETAILED DESCRIPTION OF THE PREFERRED EMBODIMENTS OF THE INVENTION

Figure 1:
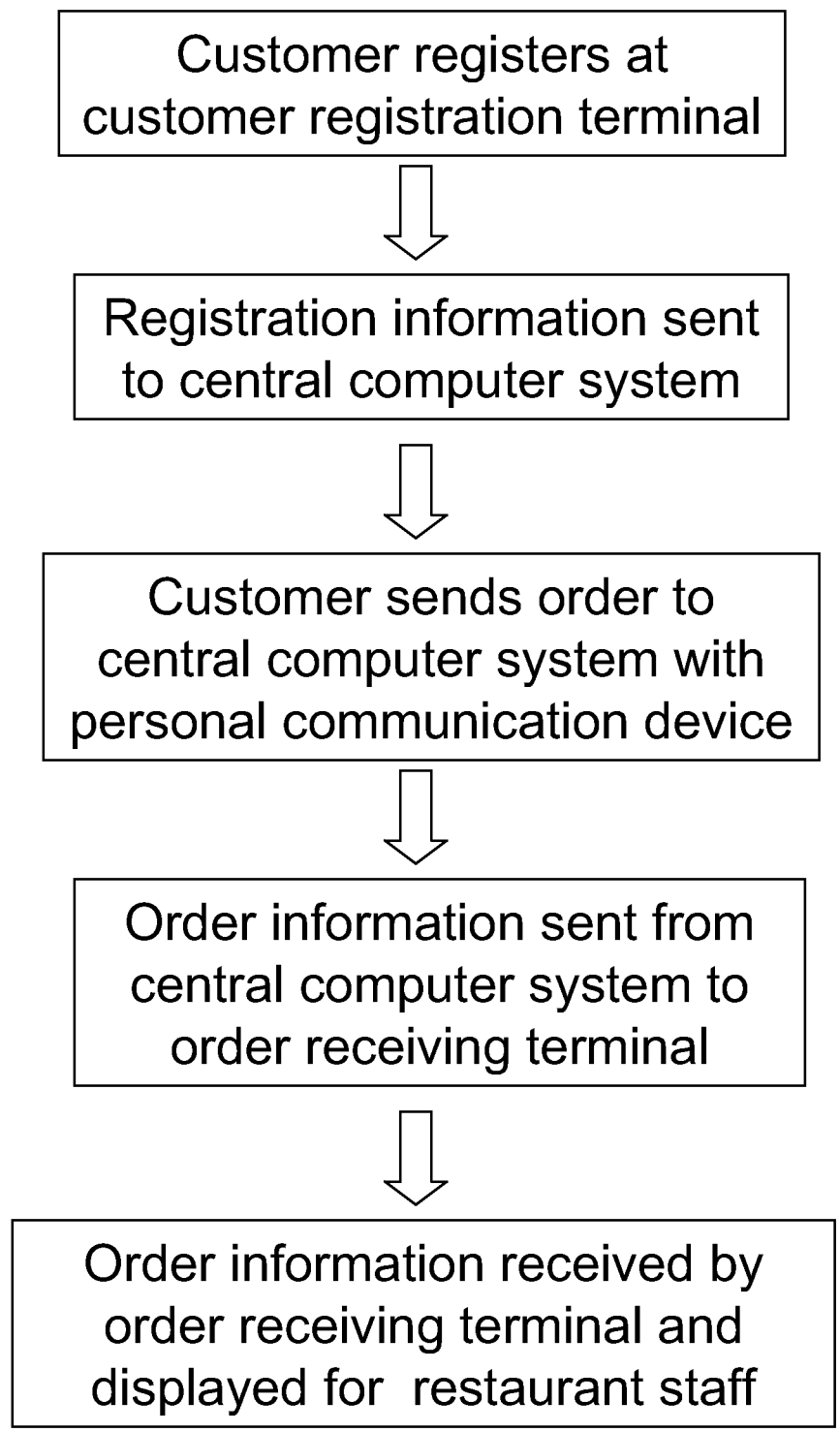
FIG. 1, is a flowchart showing the method for placing orders utilizing a central computer system for receiving and processing customer order information from a customer's personal communication device in accordance with the present invention.

In accordance with the present invention there is provided a system and method for placing food and drink orders within a restaurant. The system and method provide for efficient ordering and subsequent payment by the customer. The system allows customers to register upon entering a restaurant thus allowing the customers to subsequently place one or more orders for food and drinks via a personal communication device such as a cellular phone, laptop, or personal desktop assistant (PDA). The system may be implemented in all types of restaurants regardless of the restaurant size.

The ordering system comprises a customer registration terminal and an order receiving terminal. The ordering system may further include a central computer system in communication with the customer registration terminal and the order receiving terminal. The customer registration terminal, the order receiving terminal, and the central computer system may all be in communication with one another via hard wired connections and/or wireless connections in a computer network. The connection to the central computer system may be provided via the internet or a private network (i.e. intranet). Alternatively, the customer registration terminal and the order receiving terminal may be in direct communication via hard wired connections and/or wireless connections without the need for a central computer network. When in direct communication, data is directly transferred between the customer registration terminal and the order receiving terminal.

The customer registration terminal allows the customer to register with the ordering system upon entering the restaurant. By having the customer register with the ordering system, the customer may be verified as an actual customer in the restaurant and thus be allowed to make subsequent orders with a personal communication device. Prior to, during, or after registration, the customer may be provided a telephone number to which a text message order may be sent or an email address to which an email order may be sent.

The customer registration terminal generally comprises a visual display and the necessary hardware to allow the customer to input the required registration information. The hardware for entering the user information may include one or more selected from a keyboard, a visual display with touch screen capability, a credit card reader, and a computer/device with speech recognition capability. The customer registration terminal may be installed at the entrance or front counter of the restaurant such that it will be easily accessible by customers upon entering the restaurant. Upon registration, the required registration information may be sent from the customer registration terminal to the central computer system for processing. The restaurant location may also be sent with the required registration information where the central computer system processes orders for multiple restaurants.

The required registration information may include a cellular phone number to allow for ordering via text messaging or an email address to allow for ordering via email. The cellular phone number or email address may be entered at the customer registration system via a keyboard, touch screen, or any other suitable device. The cellular phone number or email address may be used as an identifier by the ordering system to recognize a customer placing an order at a particular restaurant. The cellular phone number or email address may also allow the restaurant to communicate with the customer regarding the customer's order.

The required registration information may also include selection of a method of payment for the placed orders. The customer may select payment by cash, credit card, or debit card. The customer registration terminal may also allow the customer to enter coupons or promotion codes to be used at the restaurant. Upon selecting to pay by credit card, the customer provides credit card information to use for the subsequent transaction. To allow the customer to input credit card information quickly, a credit card reader may be included at the customer registration system such that the customer may simply swipe a credit card through the credit card reader to input the credit card information. The customer may also select to pay by credit card by swiping the credit card through the card reader. The customer registration terminal may also allow for manual input of credit card information via a keyboard or touch screen. If the customer wishes to pay by cash, the customer selects the cash payment option and makes the necessary payment arrangements with the restaurant. The customer may be required to tender payment at the customer registration station immediately upon placing order or the customer may tender payment at any time prior to leaving the restaurant. The customer registration system may also be equipped with a cash receiving device thereby allowing the customer to pay immediately upon placing an order.

The registration terminal may also allow the customer to select an available table or seat in the restaurant. By allowing the customer to select a table or seat, orders may be conveniently brought to the customer once prepared. To allow the customer to select a table, the visual display may display a representative map of the dining area with the customer being able to select a table or seat using a touch screen or entering information specific to the desired table or seat.

The order receiving terminal allows the restaurant staff to perform one or more tasks selected from receiving orders, viewing orders, editing orders, and cycling through the orders placed by restaurant customers. The order receiving terminal may also allow the restaurant staff to communicate with the customer via the customer's personal communication device. When the customer places an order via the customer's personal communication device, the order information is transferred to the order receiving terminal and displayed for viewing and handling by the restaurant staff.

The order receiving terminal comprises a visual display and the necessary hardware to receive orders, view orders, edit orders, and cycle through the orders on the visual display. The order receiving terminal may additionally comprise hardware for communicating with the customer via text messaging and/or email. The hardware for communicating with the customer may include one or more selected from a keyboard, visual display with touch screen, and a computer/ device with speech recognition capability. Communication with the customer may be used to confirm orders or inform the customer when the order is ready.

The order receiving terminal also has the necessary hardware to receive order information from the customer. The order information may be transferred to the order receiving terminal from a central computer system which received the order from the customer's personal communication device. Alternatively, the order may be sent directly to the order receiving terminal from the customer's personal communication device. To receive information directly from the customer, the order receiving terminal or a device connected thereto requires a telephone number to receive text message orders from the customer or an email address to receive email orders from the customer. The order receiving terminal may utilize both a telephone number to receive text message orders and an email address to receive email orders from the customer. As such, the order receiving terminal will require connection to a telephone/cellular network to receive text messages and an internet connection to receive email orders.

Once the customer is registered, the customer may place an order via a text message or email. After an order is placed by the customer, the order information is transferred to the order receiving terminal for preparation by the restaurant staff. As previously discussed, the order information may be sent to the order receiving terminal via a central computer system or may be sent directly to the order receiving terminal from the customer's personal communication device.

Once the order information is received, the order information is displayed on the visual display where it may be recognized by a restaurant employee. Once recognized, the restaurant staff begins preparing the order for the customer. To aid in recognition of new orders by the restaurant staff, the order receiving terminal may have a visual and/or audible indicator which signals once a new order is received.

As previously discussed, the ordering system may utilize a central computer system to receive orders from a customer and transfer the orders to the order receiving terminal. When a customer registers at the customer registration terminal, the registration information is transferred to the central computer system from processing thereby allowing the customer to make subsequent orders. When utilizing a central computer system, the registration information sent to the central computer system may additionally include one or more selected from the restaurant name, restaurant address, restaurant ID, restaurant email address, and restaurant phone number. The central computer system may be specific to a certain restaurant, a restaurant chain or group of restaurants. The central computer system may also be operated by a service provider to which restaurants subscribe to use the ordering system. The central computer system may be any type computer system capable of receiving information from text messages and/or emails and communicating the information to the order receiving terminal.

The personal communication device utilized by the customer may include a cellular phone, text message device, media player, personal desktop assistant (PDA), laptop computer, or any other device capable of sending text messages or emails. Personal communication devices utilized by the customer may have picture taking capability and/or bar scanning capability. Such functions may be used to select and order items in accordance with the present invention. For instance, a customer may take digital pictures of selected menu items and communicate the pictures to the order receiving terminal to place the order. The pictures of the selected items may be placed in a text message or email for communication to the order receiving terminal. Similarly, the customer may utilize a barcode scanner on the personal communication device to select items from a menu. The data representing the selected items may then be placed in a text message or email and communicated to the order receiving terminal.

To place an order in accordance with the present invention, the customer first enters the restaurant and registers at the customer registration terminal. To register, the customer inputs the required registration information which may include one or more selected from cellular phone number, email address, selection of payment type (cash or credit), credit card information, customer's name, customer's physical address, and desired seat selection. If cash payment is selected, the customer may tender the due amount to the restaurant upon ordering, receiving the order, or leaving the restaurant. If credit card payment is selected, the customer provides the credit card information during registration such that the credit card can be charged by the restaurant. The credit card information may be manually entered or entered via a credit card reader.

Figure 2:
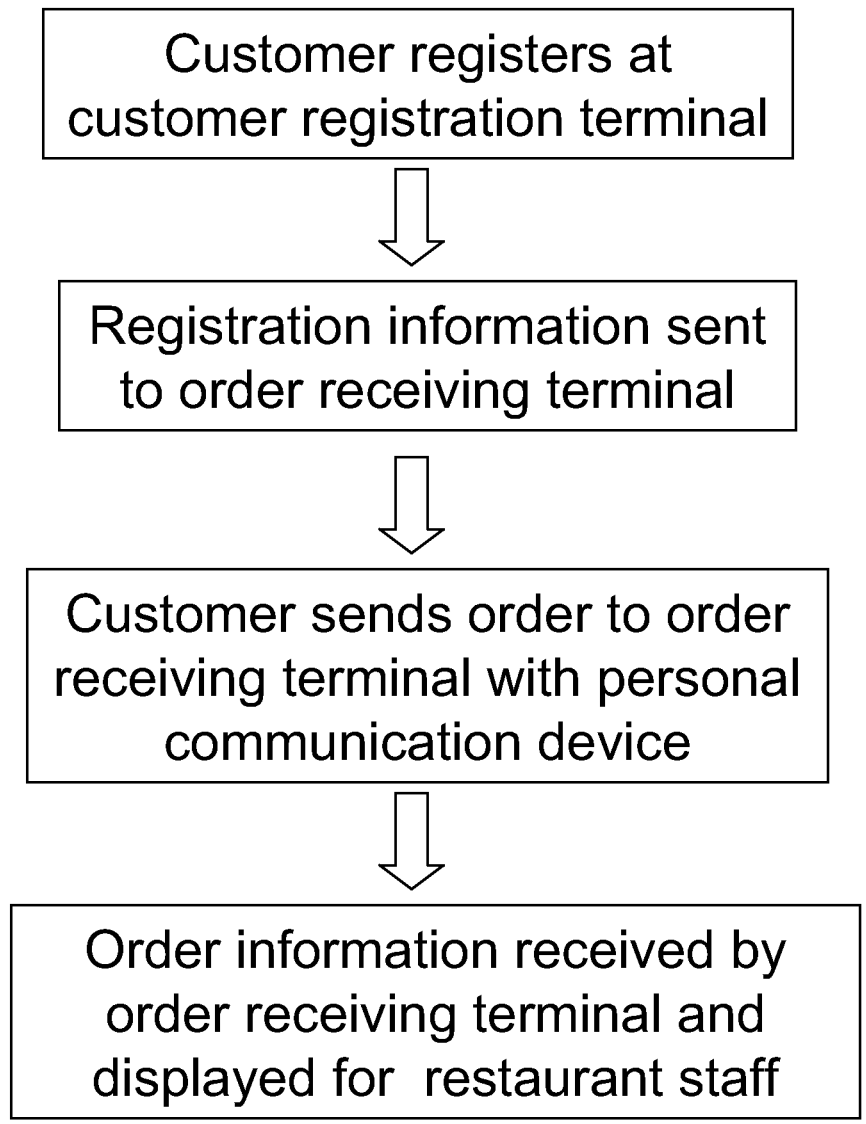
FIG. 2, is a flowchart showing the method for placing orders utilizing a order receiving terminal for receiving and processing customer order information from a customer's personal communication device in accordance with the present invention.

Once registered, the customer may place one or more orders using a personal communication device via text messaging to a phone number provided by the restaurant or email to an email address provided by the restaurant. When placing an order, the order may be sent to a central computer system which may be onsite or offsite. FIG. 1 is a flowchart showing the ordering process when utilizing a central computer system. Upon receiving the order, the central computer system forwards the order information to the order receiving terminal such that the order may be processed by the restaurant. The order may also be sent directly to the order receiving terminal for processing, as shown in FIG. 2. Once the order information is received by the order receiving terminal, the order information will be displayed and restaurant staff will see the order and fill it. When the order is processed, the terminal may then charge the customer's credit card (if credit card payment was selected) based on the credit card information provided upon registration. Alternatively, the customer's credit card may be charged when processed by the central computer system.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A restaurant order processing system for use in a restaurant comprising:
   a customer registration terminal;
   an order receiving terminal; and
   a payment receiving terminal;
   said customer registration terminal, said order receiving terminal, and said payment receiving terminal located onsite within said restaurant;
   said customer registration terminal receiving customer registration information from a customer upon the customer physically entering the restaurant thus registering and verifying said customer as a customer of the restaurant and allowing the customer to submit orders via a personal communication device;
   said order receiving terminal utilizing a telephone number to receive order information in the form of a text message sent by registered customers via a personal communication device, said order receiving terminal having a display for communicating received order information to the restaurant staff;

said payment receiving terminal receiving payment from said customer via onsite interaction with said customer within the restaurant after customer places said order with said order receiving terminal.

2. The restaurant order processing system according to claim 1 further comprising:
a central computer system in communication with said customer registration terminal and said order receiving terminal, said central computer system receiving the customer registration information from said customer registration terminal and order information from the restaurant customer sent via said personal communication device and communicating the order information to said order receiving terminal at the restaurant.

3. The restaurant order processing system according to claim 2, wherein said central computer system is located at a location off site from the restaurant.

4. The restaurant order processing system according to claim 1, wherein said customer registration terminal comprises a touch screen for providing customer registration information.

5. The restaurant order processing system according to claim 4, wherein said touch screen allows customers to select a desired seat based on availability within the restaurant.

6. The restaurant order processing system according to claim 1, wherein said customer registration terminal and said order receiving terminal are in direct communication, whereby customer registration information is communicated to said order receiving terminal upon customer registration thereby allowing the customer to place an order directly to said order receiving terminal via said personal communication device.

7. The restaurant order processing system according to claim 1, wherein said order receiving terminal comprises communication hardware for communicating with the customer via said personal communication device, the communication hardware being selected from one or more of the group consisting of a keyboard, visual display with touch screen, and a computer with speech recognition capability.

8. The restaurant order processing system according to claim 1, wherein said customer registration terminal comprises a credit card reader for receiving credit card information from said customer.

9. A method for placing an order in a restaurant comprising:
receiving registration information via a customer registration terminal located onsite within said restaurant from a customer upon the customer physically entering the restaurant thus registering and verifying said customer as a customer of the restaurant and allowing said customer to place an order via the customer's personal communication device;
providing a phone number for placing an order via text message to the customer from said customer registration terminal;
receiving an order via an order receiving terminal located onsite within said restaurant for one or more items in the form of a text message from the customer via a personal communication device;
receiving payment from said customer via onsite interaction with a payment receiving terminal located onsite within said restaurant; and
displaying said order on said order receiving terminal for processing by the restaurant staff.

10. The method according to claim 9, wherein said order from the customer is received by a central computer system in communication with said customer registration terminal and said order receiving terminal, said central computer system receiving the customer registration information from said customer registration terminal and orders from the restaurant customer sent via said personal communication device and communicating the orders to said order receiving terminal at the restaurant.

11. The method according to claim 10, wherein the customer registration information includes one or more selected from the restaurant name, restaurant address, restaurant ID, restaurant email address, and restaurant phone number.

12. The method according to claim 10, wherein said central computer system is located at a location off site from the restaurant.

13. The method according to claim 9, wherein said customer registration terminal and said order receiving terminal are in direct communication, whereby customer registration information is communicated to said order receiving terminal upon customer registration thereby allowing the customer to place an order directly to said order receiving terminal via said personal communication device.

14. The method according to claim 9, wherein said registration information includes one or more selected from the group consisting of the customer's cellular phone number, payment information, and desired seat location.

* * * * *